(12) United States Patent
Wagner et al.

(10) Patent No.: US 7,515,051 B2
(45) Date of Patent: Apr. 7, 2009

(54) RFID ANTENNA SYSTEM HAVING REDUCED ORIENTATION SENSITIVITY

(75) Inventors: James D. Wagner, Tangent, OR (US); Mark R. Cohen, Elmira, OR (US); Clarke W. McAllister, Eugene, OR (US)

(73) Assignee: Datalogic Mobile, Inc., Eugene, OR (US)

( * ) Notice: Subject to any disclaimer, the term of this patent is extended or adjusted under 35 U.S.C. 154(b) by 219 days.

(21) Appl. No.: 11/356,887

(22) Filed: Feb. 17, 2006

(65) Prior Publication Data

US 2007/0194929 A1 Aug. 23, 2007

Related U.S. Application Data

(60) Provisional application No. 60/775,983, filed on Feb. 25, 2005.

(51) Int. Cl.
*G08B 13/14* (2006.01)
(52) U.S. Cl. ............... 340/572.7; 340/572.4; 340/572.1
(58) Field of Classification Search ............. 340/572.7, 340/572.1, 572.4, 539.11, 505, 10.1, 10.2, 340/10.5; 235/380, 385
See application file for complete search history.

(56) References Cited

U.S. PATENT DOCUMENTS

| 5,061,944 | A | 10/1991 | Powers et al. ............... 343/795 |
| 5,563,616 | A | 10/1996 | Dempsey et al. ............ 343/753 |
| 5,569,306 | A | 10/1996 | Thal ............................ 606/232 |
| 5,640,002 | A | 6/1997 | Ruppert et al. ............. 235/472 |
| 5,719,586 | A | 2/1998 | Tuttle ......................... 343/726 |
| 5,777,561 | A | 7/1998 | Chieu et al. ............. 340/825.54 |
| 5,945,660 | A * | 8/1999 | Nakasuji et al. ......... 235/462.46 |
| 6,069,564 | A | 5/2000 | Hatano et al. ............. 340/572.7 |
| 6,122,329 | A | 9/2000 | Zai et al. .................... 375/329 |
| 6,150,948 | A | 11/2000 | Watkins .................... 340/693.3 |
| 6,305,607 | B1 | 10/2001 | Katz et al. ............. 235/462.45 |
| 6,326,926 | B1 | 12/2001 | Shoobridge et al. ......... 343/702 |
| 6,407,665 | B2 | 6/2002 | Maloney ................... 340/568.1 |
| 6,415,978 | B1 | 7/2002 | McAllister ............. 235/462.01 |
| 6,445,297 | B1 | 9/2002 | Nicholson ................. 340/572.7 |
| 6,466,771 | B2 * | 10/2002 | Wood, Jr. .................... 455/101 |
| 6,617,962 | B1 | 9/2003 | Horwitz et al. ............. 340/10.4 |
| 6,696,954 | B2 | 2/2004 | Chung ..................... 340/572.7 |
| 6,703,935 | B1 | 3/2004 | Chung et al. .............. 340/572.7 |
| 6,720,930 | B2 | 4/2004 | Johnson et al. ............. 343/742 |
| 6,724,308 | B2 | 4/2004 | Nicholson ................. 340/572.1 |
| 6,732,923 | B2 | 5/2004 | Otto ........................... 235/383 |
| 6,768,415 | B1 | 7/2004 | Turtle ........................ 340/10.4 |
| 6,781,508 | B2 | 8/2004 | Tuttle et al. ................ 340/10.1 |
| 6,946,950 | B1 * | 9/2005 | Ueno et al. ................. 340/10.1 |
| 6,956,472 | B1 | 10/2005 | Walcott, Jr. et al. ......... 340/505 |

(Continued)

*Primary Examiner*—Van T. Trieu
(74) *Attorney, Agent, or Firm*—Stoel Rives LLP

(57) ABSTRACT

Radio Frequency Identification (RFID) antennas systems and methods that are less sensitive to orientation. One example includes an interrogator having a radio frequency transceiver, a first linearly polarized antenna in electrical communication with the transceiver, and a second linearly polarized antenna in electrical communication with the transceiver, the second antenna having a polarization in a direction substantially perpendicular to the first antenna; a control circuit is in electrical communication with the transceiver and with the first and second antennas, the control circuit operable to switch between interrogating with the first antenna and interrogating with the second antenna, and an RFID decoder is coupled to an output of the transceiver to decode an interrogated electromagnetic signal from a tag.

36 Claims, 4 Drawing Sheets

U.S. PATENT DOCUMENTS

| | | |
|---|---|---|
| 6,970,518 B2 | 11/2005 | Kuffner et al. .............. 375/259 |
| 7,075,412 B1 * | 7/2006 | Reynolds et al. ........... 340/10.2 |
| 7,197,279 B2 * | 3/2007 | Bellantoni ................. 455/41.2 |
| 7,239,858 B2 * | 7/2007 | Bellantoni ............... 455/277.1 |
| 7,253,717 B2 * | 8/2007 | Armstrong et al. ......... 340/10.2 |
| 2002/0167405 A1 | 11/2002 | Shanks et al. ............ 340/572.1 |
| 2004/0073933 A1 | 4/2004 | Gollnick et al. ................ 725/81 |
| 2006/0017634 A1 | 1/2006 | Meissner .................... 343/742 |
| 2007/0279192 A1 * | 12/2007 | Tanaka ...................... 340/10.2 |

\* cited by examiner

RFID ANTENNA SYSTEM HAVING REDUCED ORIENTATION SENSITIVITY

RELATED APPLICATION DATA

This application claims benefit under 35 U.S.C. § 199(e) of U.S. Provisional Application No. 60/775,983, entitled "Orientation Insensitive Mobile RFID Antenna System," filed Feb. 25,2005, which is herein incorporated by specific reference.

BACKGROUND

The present disclosure relates generally to wireless identification systems and methods, and more specifically, but not exclusively, to a radio frequency identification (RFID) system that employs alternate control of non-parallel antennas to make tag identification orientation less sensitive.

Electromagnetic tag readers have been developed in the art to electronically sense the identification of an electromagnetically coupled tag over varying distances. RFID transponders are examples of such tags, which are operated in conjunction with RFID readers (or "interrogators") for a variety of purposes, to include inventory control and data collection. An item having a tag associated with it is brought into a read zone established by the reader. The RFID reader generates a modulated electromagnetic signal at a carrier frequency. The modulated signal, which carries information, communicates the information at a rate that is lower than the carrier frequency. The RFID reader transmits an interrogating RF signal, which is re-modulated by a receiving tag in order to impart information stored within the tag to the signal. The receiving tag then transmits the re-modulated answering RF signal to the reader, which is often, but not always, mobile or portable.

In passive (and in some active) RFID transponders (tags), antennas connected to the tag's front-end need to produce an output voltage that is above some threshold voltage to power the RFID circuit of the tag. This output voltage is obtained within the tag's antenna, together with the tag's front-end circuitry, via electromagnetic induction with the tag reader's transmitted electromagnetic signal. When sufficient current is induced in the tag, then the output voltage is large enough to operate the RFID circuit, allowing the re-modulation and transmission of the identification signal. In contrast, when the voltage and/or power requirements of the RFID circuit are not fulfilled, the RFID circuit will not resonate. If the received signal strength is not optimal, the distance between the tag reader and the tag must be reduced for continued operation of the tag, thus decreasing the utility of the reader.

In space free of any obstructions or absorption mechanisms the strength of the electromagnetic field is reduced in inverse proportion to the square of the distance. For a wave propagating through a region in which reflections can arise from the ground and from obstacles, the reduction in strength can vary quite considerably, in some cases as an inverse fourth power of the distance. Thus, the distance between a tag reader and a tag and the environment in which a tag is interrogated may both have a significant effect on the success of receiving a response from the tag.

In RFID readers generally, the relative orientation or polarization between the reader and the tag has a strong influence on the strength of the re-modulated radio signal that carries the tag identification from the tag. The more parallel the two are in orientation, the stronger the re-modulated radio signal. As a consequence, circular polarization is desired to provide favorable relative orientation when the tag passes through the read zone, regardless of the tag's orientation. However, these types of RFID readers have had to sacrifice approximately half their power output to do so, thus the advantage is often questionable. The power loss is due to having to provide power to two orthogonal (or perpendicular) antennas simultaneously, for instance to provide circular polarization, thus requiring to half the power to each antenna that would otherwise power a single antenna.

SUMMARY OF THE DISCLOSURE

Various embodiments are described herein directed to systems and methods for making RFID antennas less sensitive to orientation. According to one embodiment, an electromagnetic tag reader comprises a plurality of linearly polarized antennas, a control circuit, and transceiver circuitry. The plurality of linearly polarized antennas has at least a first antenna and a second antenna arranged non-parallel to the first antenna. The control circuit, which is in electrical communication with the plurality of antennas, is operable to switch the plurality of antennas on and off so that the first and second antennas transmit at different times. The circuitry, which is coupled to an output of the plurality of antennas, receives an electromagnetic signal from a tag in response to a transmission from one of the plurality of antennas.

According to another embodiment, a system comprises an RFID interrogator having a RF transceiver, first and second linearly polarized antennas, a control circuit, and an RFID decoder. The first linearly polarized antenna is in electrical communication with the transceiver. The second linearly polarized antenna is in electrical communication with the transceiver. The second antenna has a polarization in a direction substantially perpendicular to the first antenna. The control circuit is in electrical communication with the transceiver and with the first and second antennas. The control circuit is operable to switch between interrogating with the first antenna and interrogating with the second antenna. The RFID decoder is coupled to an output of the transceiver to decode an interrogated electromagnetic signal from a tag.

Another embodiment is directed to a method for identification tag interrogation comprising the steps of alternately transmitting an electromagnetic signal from a plurality of non-parallel, linearly polarized antennas so that less than all antennas transmit at the same time, receiving a return electromagnetic signal including the identification of a tag in response to a transmission from one or more of the plurality of antennas, and processing the return electromagnetic signal to extract the tag's identification.

Another embodiment is directed to a method for identification tag interrogation comprising the steps of transmitting a first electromagnetic signal with a first linearly polarized antenna, transmitting a second electromagnetic signal with a second linearly polarized antenna before or after the transmission of the first electromagnetic signal, the second antenna having a polarization in a direction not appreciably parallel to the first antenna, receiving a return electromagnetic signal including the identification of a tag in response to a transmission from one of the first and second antennas, and processing the return electromagnetic signal to extract the tag's identification.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are therefore not to be considered to limit the scope of the disclosure, the embodiments will be described and explained with specificity and detail in reference to the accompanying drawings, herein described.

DETAILED DESCRIPTION OF PREFERRED EMBODIMENTS

The embodiments of this disclosure will be best understood by reference to the drawings, wherein like parts are designated by like numerals throughout. It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments, each of which may differ in a variety of ways. While the various aspects of the embodiments are presented in drawings, the drawings are not necessarily drawn to scale unless specifically indicated. In addition, the steps of a method do not necessarily need to be executed in any specific order, or even sequentially, nor need the steps be executed only once, unless otherwise specified.

The phrases "connected to," "coupled to," and "in communication with" refer to any form of interaction directly or indirectly between two or more entities, including mechanical, electrical, magnetic, electromagnetic, fluid, and thermal interaction. "In electrical communication with" further refers to any form of electrical sending and receiving of any type of electrical signal, for instance, to the extent two structures may communicate electronically. For example, two components may be coupled to each other even though they are not in direct contact with each other.

As one skilled in the art will appreciate, certain embodiments may be capable of achieving certain advantages over the known prior art, including some or all of the following: (1) provide multidirectional polarization via a set of non-parallel antennas that are switched on and off one at a time by an electromagnetic tag reader, thus making the tag reader less sensitive to the orientation of a tag; (2) reduce loss in the tag reader's transmitted signal, and thus also in the answering tag signal received by the tag reader; (3) permit reading across a greater distance between the electromagnetic tag reader and a tag because of the reduced signal loss. These and other advantages of various embodiments will be apparent upon reading the following.

Figure 1A:
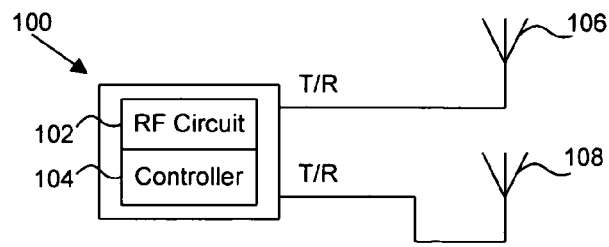
FIG. 1A is a circuit drawing of a direct switching embodiment of an electromagnetic tag reader, such as an RFID reader.

FIG. 1A is a circuit drawing of a direct switching embodiment of an electromagnetic tag reader 100, such as an RFID reader. As discussed, the tag reader 100, which may also be known as an "interrogator" because of the manner in which the tag reader 100 transmits electromagnetic signals that induce a current in a tag, causes the tag to respond with a re-modulated signal comprising at least its identity, in addition to other data. The identity may be conveyed, for example, by the amplitude of the particular re-modulated signal that is sent back to the tag reader 102 for reception. In addition, the tag reader 100 as disclosed herein may be used not only to enhance the signal power with which to read a passive tag, but also as a way to boost a signal generated by an active tag. The discussion herein should in no way limit the applicability of a tag reader 100 to active tags, but should be applicable to other types of tags.

The tag reader 100 may include a dual-axis, linearly polarized antenna arrangement, each in electrical communication with a radio frequency (RF) circuit 102 and a controller 104. The RF circuit 102 may include transmit/receive (T/R) circuitry and the controller 104 may execute switching through a control circuit. Both the RF circuit 102 and the controller 104 may be integrated, such as on a single integrated circuit, and the two may communicate electronically.

The antenna arrangement may include a first linearly polarized antenna 106 in electrical communication with the RF circuit 102 in a non-parallel orientation to a second linearly polarized antenna 108, also electrically communicating with the RF circuit 102. Each antenna 106 and 108 may both transmit and receive an electromagnetic signal. A maximum coverage of the antenna arrangement may be obtained by orienting the first antenna 106 orthogonal (or perpendicular) to the second antenna 106. In one embodiment, perpendicular relationships may include one antenna having a vertical, and the other antenna having a horizontal, orientation. Antennas 106 and 108 may be patch antennas and may also be included as an integrated structure with the RF circuit 102 and the controller 104 on a printed circuit board (PCB). In the alternative, antennas 106 and 108 (as well as other antennas discussed herein) may also be dipole, vertical, phased, driven and reflector, or loop antennas, or other linearly polarized antennas known in the art, and coupled to the RF circuit 102 in ways known in the art. Each antenna 106 and/or 108 may be a single antenna element or an array of multiple elements.

The control circuit 104 may be controllable by user intervention or may be completely automated through software, firmware, and/or hardware to provide direct, alternate switching between the first 106 and second 108 antennas. The rate of switching generally depends on the data bit rate of the tag reader 100, which generally varies with the reader and the types of tags being read, although basic bit rates are generally known in the art. In one embodiment, a tag reader 100 attempts a read with a first antenna 106, waits until all responses have been received (for instance there could be more than one tag in the vicinity), and then switches to read with a second antenna 108. The need to wait after switching long enough to sense a response signal may also limit the practical rate of switching used in RFID interrogation. Thus, there are tradeoffs with respect to response speed and accuracy.

As long as the two antennas are not activated simultaneously, however, the full power supplied to the tag reader 100 may be passed on to either of antenna 106 or 108 having a more favorable (i.e., generally more parallel) orientation with a tag at any given moment. This electromagnetic tag reader 100 provides a significant probability that a tag will be interrogated at a favorable orientation with the tag reader 100, which thus may read the tag at further distances from the tag. The net result is a tag reader 100 with a greater degree of polarization insensitivity in its interrogation of a tag, but without the usual power loss associated with true circular polarization needed for orientation insensitivity.

Figure 1B:
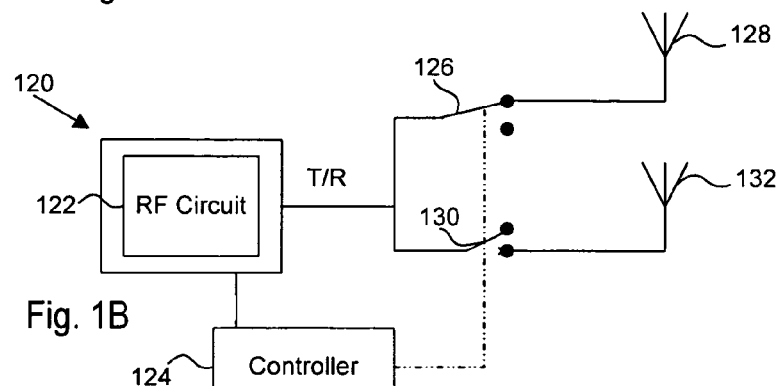
FIG. 1B is a circuit drawing of another embodiment of an electromagnetic tag reader, to include a controller.

FIG. 1B is a circuit drawing of another embodiment of an electromagnetic tag reader 120, such as an RFID interrogator, to include an RF circuit 122 and a separate controller 124. The dual-axis, non-parallel antenna arrangement discussed above may also be employed in this embodiment 120. A first transmitter/receiver (T/R) switch 126 connects the RF circuit 122 to a first linearly polarized antenna 128 in a first orientation. A second T/R switch 130 connects the RF circuit 122 to a second linearly polarized antenna 132 in a second orientation. As discussed, the first 128 and second 132 antennas may be in a relationship of non-parallel orientation, and may further be perpendicular to each other in alternative embodiments.

The controller 124 may include a microprocessor and/or other control circuitry, shown diagrammatically as element 125, which may be run by any form of software or firmware storable on a computer readable medium. The controller 124 may be coupled to both the RF circuit 122 and to the T/R switches 126 and 130. The switching between the first 128 and second 132 linearly polarized antennas may be controlled by the controller 124 such that only one antenna transmits at a time. One skilled in the art will appreciate that additional linearly polarized antennas, all having a non-parallel relationship, may be singly switched on and off to provide even further coverage to increase the probability of favorable orientations between the tag reader 120 and a tag. Such a plurality of non-parallel antennas may be switched on and off sequentially, or randomly. Additionally, the level of success in reading a tag may be used as feedback to affect the sequence and/or rate of switching.

Figure 1C:
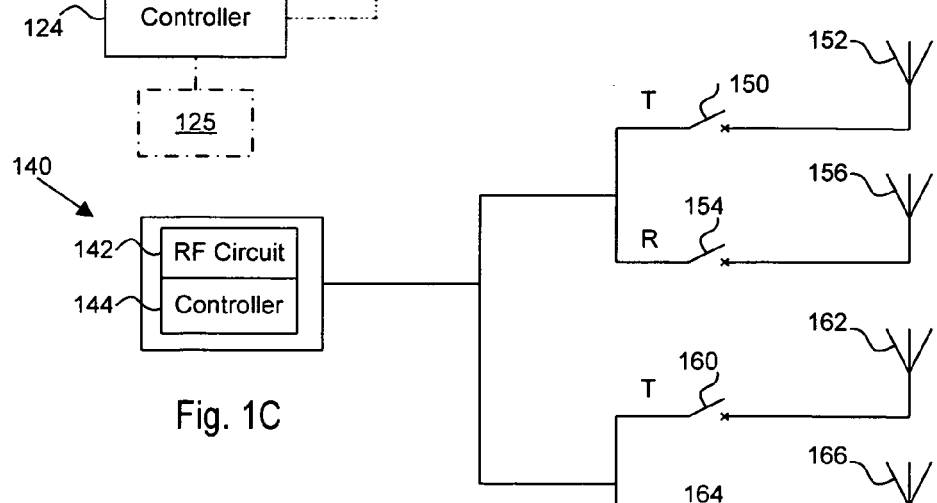
FIG. 1C is a circuit drawing of an embodiment of an electromagnetic tag reader using a plurality of switched antennas in various orientations.

FIG. 1C is a circuit drawing of an embodiment of an electromagnetic tag reader 140 using a plurality of switched antennas in various orientations. As before, the tag reader 140 may include an RF circuit 142 for receiving and transmitting electromagnetic signals, such as radio signals to induce a response signal from a tag to provide tag identification. The tag reader 140 may further include a controller 144 in electrical communication with the RF circuit 142 and with a plurality of non-parallel antennas. In one embodiment, the plurality of non-parallel antennas may include a set of substantially perpendicular antennas so that the tag reader 140 may interrogate a tag of most any orientation, providing reduced orientation sensitivity interrogation without the loss of power normally associated with true circular polarization.

To form such a plurality of antennas, a first set of antennas 152, 156 may be connected to the RF circuit 142 and the controller 144. A first T/R switch 150 may connect a first linearly polarized antenna 152 to the RF circuit 142 and a second T/R switch 154 may connect a second linearly polarized antenna 156 to the RF circuit 142. This set of antennas 152 and 156 may be orientated at a first orientation, and the first antenna 152 may interrogate for a tag's electromagnetic signal while the second antenna 156 may receive the interrogated signal, or vice versa. In addition, a second set of antennas 160, 164 may be connected to the RF circuit 142 and the controller 144. For instance, a third T/R switch 160 may connect a third linearly polarized antenna 162 to the RF circuit 142, and a fourth T/R switch 164 may connect a fourth linearly polarized antenna 166 to the RF circuit 142. The second set of antennas 162 and 166 may be at a second orientation, and the third antenna 162 may interrogate for a tag's electromagnetic signal while the forth antenna 166 may receive the interrogated signal, or vice versa. The first and second orientations should be non-parallel to each other. Such orientation may be perpendicular in one embodiment. In such an embodiment, the first orientation may be vertical and the second orientation may be horizontal.

It should be appreciated that more than two sets of antennas 148 and 158 may be included in FIG. 1C, such as suggested with reference to FIGS. 1A and 1B, as long as at least a first set of antennas is non-parallel to a second set of antennas. Also, the controller 144 may switch on and off the sets of antennas singly, so that only one set of antennas is interrogating at any given time. This switching, however, may be done quickly to always catch a tag moving past the tag reader 140. This switching will ensure full power is being transmitted through the interrogating antenna that happens to have the most favorable orientation with a tag, and that, therefore, a stronger signal will be returned by the tag in response.

Figure 1D:
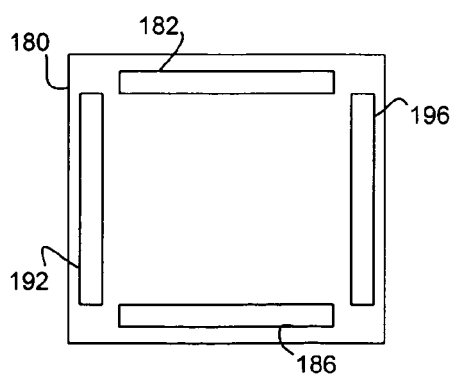
FIG. 1D is a pictorial representation of a possible antenna array employable with the embodiment of FIG. 1C, using patch antennas.

The controller 144 may include a microprocessor and may further be integrated with the RF circuit 142 on a single semiconductor chip. In addition, in one embodiment, a PCB 180 (shown in FIG. 1D) may be employed to include not only a microprocessor and RF circuit 142 circuitry, but also a set of patch antennas located near the microprocessor and RF circuitry 142 for quicker switching. The PCB 180 may include linearly polarized patch antennas 182 and 186 as a first set of antennas at a first orientation, and linearly polarized patch antennas 192 and 196 as a second set of antennas at a second orientation, such as discussed above. The PCB 180 with a plurality of antennas may also connect to the RF circuit 142 and controller 144 circuitry located off the PCB 180. Use of patch antennas for this application may allow building tag readers 100, 120, and 140 of smaller, more mobile size. This construction may be especially useful in inventory-related applications where a tag reader may be carried in a wand or other convenient tracking device, which may be connected wirelessly to a computer and/or networked communication system.

Figure 2:
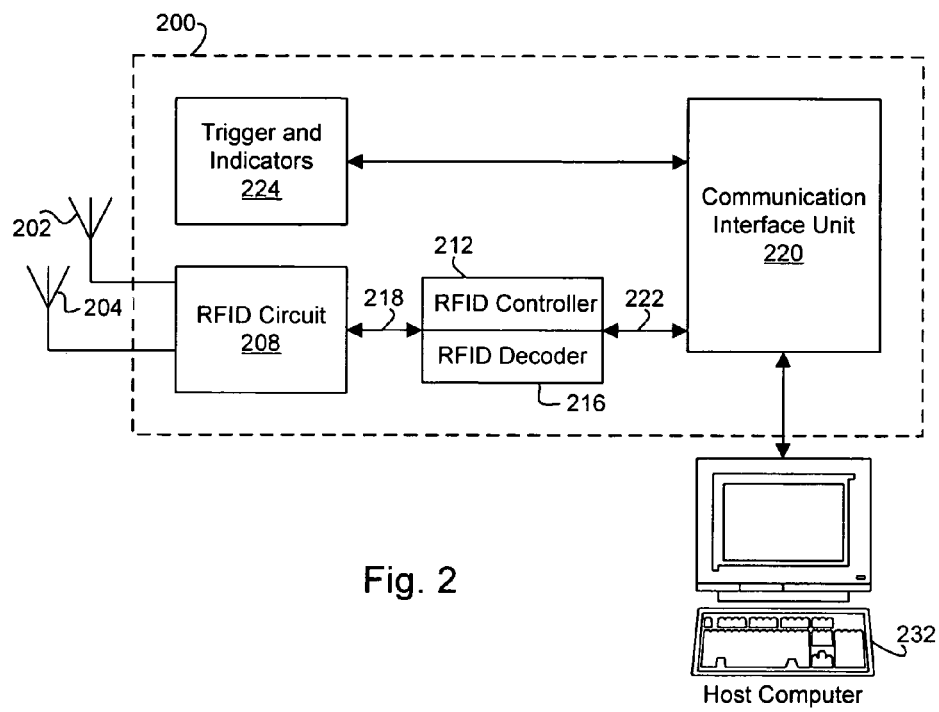
FIG. 2 is a block diagram of an embodiment of the interconnection of communication and control modules within an electromagnetic tag reader.

FIG. 2 is a block diagram of an embodiment of the interconnection of communication and control modules within an electromagnetic tag reader 200, which may be an RFID interrogator. The tag reader 200 may include at least one set of non-parallel, linearly polarized switched antennas 202 and 204, or any number of embodiments of a plurality of antennas as discussed with reference to FIGS. 1A, 1B, 1C, and 1D. The tag reader 200 may include transceiver components of an RFID circuit 208, which is connected to an RFID controller 212 and decoder 216. The RFID circuit 208 may transmit and receive electromagnetic signals to and from the RFID decoder 216 and controller 212 units via, for example, a serial communications line 218.

The RFID controller 212 may comprise a microprocessor or other control circuit, and be operable to switch on and off the antennas 202 and 204 to provide the advantages of reduced orientation sensitivity interrogation of a tag, as discussed previously. In addition, the decoder 216 may be operable to receive interrogated signals from the tag, and decode the signal to determine (or extract) the identification of the tag. As all the modules within the tag reader 200 may be integrated, the RFID circuit 208, the RFID decoder 216, and the RFID controller 212 may be located on the same integrated chip or PCB for high-speed switching and communication, as well as for ease of manufacture.

The controller 212 and decoder 216 units may be connected to a communications interface unit 220 via a control and data link 222, which may provide communication, including control signals, between a trigger and indicators unit 224 (or "trigger unit 224") and the controller 212 and decoder 216 units. The communication interface unit 220 may also provide power to tag reader 200 and all of its submodules, as herein discussed. In a hand-held device or other computer-aided device incorporating a tag reader 200, the trigger unit 224 may include visual indicators (LEDs, graphic displays, etc), audible alarms, and other indicators as may be appropriate for the application. Such indicators may let a user know when a tag is detected by the tag reader 200. The triggers of the trigger unit 224 may be manually activated devices (trigger switches, or buttons, for example), or may be virtual, being implemented in software to execute user commands either on demand, i.e., by a user over a network, or automatically, according to a pre-stored schedule or triggered by the occurrence of certain events. Such on-demand or scheduled triggers may include scanning at certain frequencies or power levels, or other sorts of identifying features in an interrogated tag.

The data link 222 may also enable the communication interface unit 220 to initialize and configure the RFID controller 212 and decoder 216 units for proper communication with, for instance, a host computer 232. Such communication with a host computer 232 may be through electrical communication with the communication interface unit 220, and which may include sending data, such as identification information interrogated from tags. This configurable aspect of the RFID controller 212 and decoder 216 units by the communication interface unit 220 allows the tag reader 200 to be incorporated in a variety of hardware devices that make convenient the gathering of tag identification information. For instance, the host computer may store the identification information data, manipulate it, and interact with the tag reader 200 to adjust the types of tags desired to be identified, or the parameters required to indicate identification.

Figure 3:
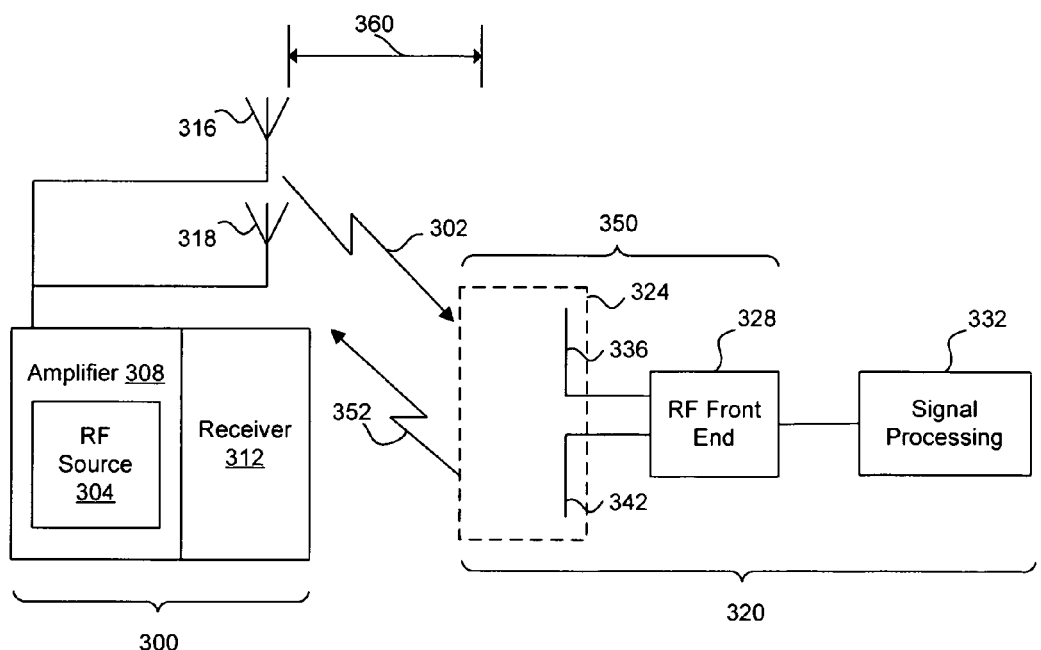
FIG. 3 is a block diagram of a radio frequency transceiver of an electromagnetic tag reader and an electromagnetic signal returning to the tag reader.

FIG. 3 is a block diagram of a radio frequency transceiver 300 (or base station) of an electromagnetic tag reader as the tag reader interrogates a tag receiver 320 by communicating an RF signal 302 to the tag's receiving antenna 324. As is well-known in the art, the transceiver 300 may be used in connection with a multiple-technology data reader when there is a need for RF wireless transmission. The transceiver 300 includes first and second RF transmitting antennas 316, 318, an RF source 304, an amplifier 308 for providing the signal to the antennas 316, 318, and a receiver 312 for receiving return signal from the tag 320.

The tag receiver 320, according to one embodiment, is an RFID tag comprising a dipole antenna 324, and RF processing section that further includes a front end 328 and a signal processing section 332. The dipole antenna 324, which includes a first element 336 and a second element 342, together with the front end 328 make up the antenna/front end combination 350.

The front end 328 can be any known front end design used with an antenna. Typically, in RFID applications using passive tags, the front end 328 converts the electromagnetic field 302 into a direct current (DC) voltage. The DC voltage supplies the power required to operate the signal processing component 332 of the RFID circuit (328 and 332 inclusive). Furthermore, the front end 328 extracts the envelope of the modulated signal from the electromagnetic field 302. The electromagnetic field 302 produces a DC voltage, which is large enough to power the tag circuitry to generate the RFID identification signal. This identification signal is in the form of a backscattered electromagnetic field 352 to transmit information to the base station 300. The required DC voltage is determined by the requirements to operate the front end 328 and signal processing component 332 a given distance 360 from the transmitter 300.

Figure 4:
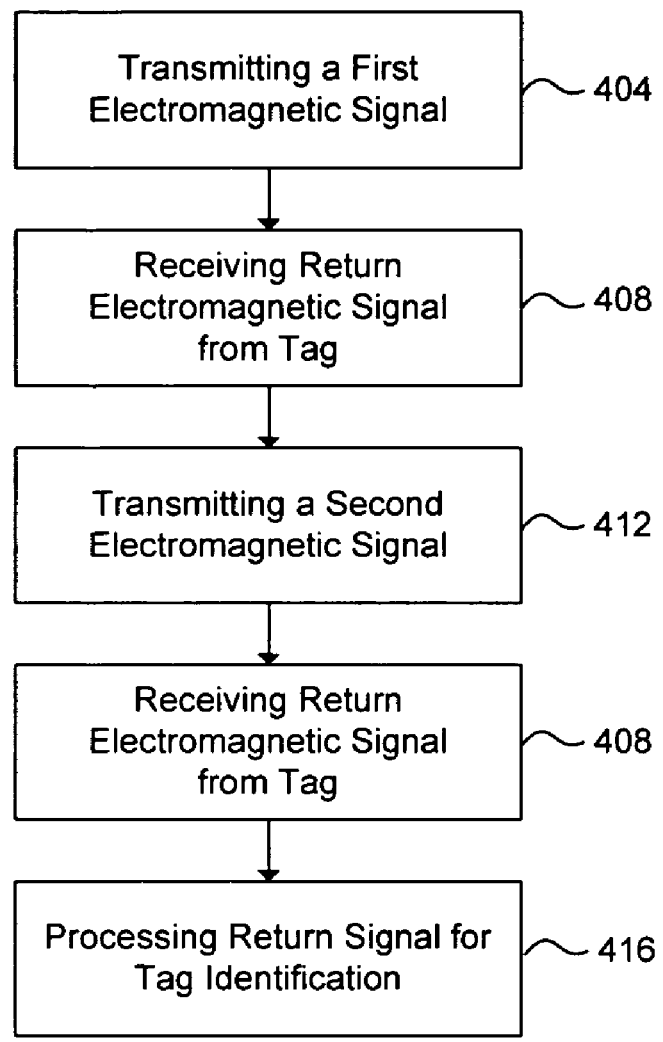
FIG. 4 is a flowchart of a method for alternate interrogation of a tag with first and second electromagnetic signals from appreciably nonparallel first and second linearly polarized antennas.

FIG. 4 is a flow chart illustrating a method 400 for alternate interrogation of a tag with first and second electromagnetic signals from substantially perpendicular first and second linearly polarized antennas. The method 400 includes the steps of transmitting at step 404 a first electromagnetic signal with a first linearly polarized antenna, and optionally, receiving at step 408 a return electromagnetic signal from the tag; transmitting at step 412 a second electromagnetic signal with a second linearly polarized antenna before or after the transmission at step 404 of the first electromagnetic signal; receiving at step 408 a return electromagnetic signal including the identification of a tag in response to a transmission from one of the first and second antennas; and processing at step 416 the return electromagnetic signal to extract the tag's identification.

The second antenna is preferably polarized in a direction substantially perpendicular to the first antenna to create orientation insensitivity to coupled tags without the power loss normally associated with circular polarization. The switching back and forth between transmitting with the first antenna and transmitting with the second antenna may be sequential. In addition, the first antenna may comprise two polarized antennas, including one to transmit the first electromagnetic signal and one to receive the return electromagnetic signal. Also, the second antenna may comprise two polarized antennas, including one to transmit the second electromagnetic signal and one to receive the return electromagnetic signal.

The method 400, and equivalents thereof, allows a tag to produce the modulated return electromagnetic signal with enough power to transmit the return signal back to the tag reader, even over larger distances. This minimization of power loss may be achieved while allowing interrogation of a tag at virtually any orientation because the method provides for multi-polarization in a tag reader's interrogation through switching. Allowing a further distance of separation may yield more accurate and conveniently obtained results of inventory or data collection, especially where the tag reader is incorporated in a mobile device.

Figure 5:
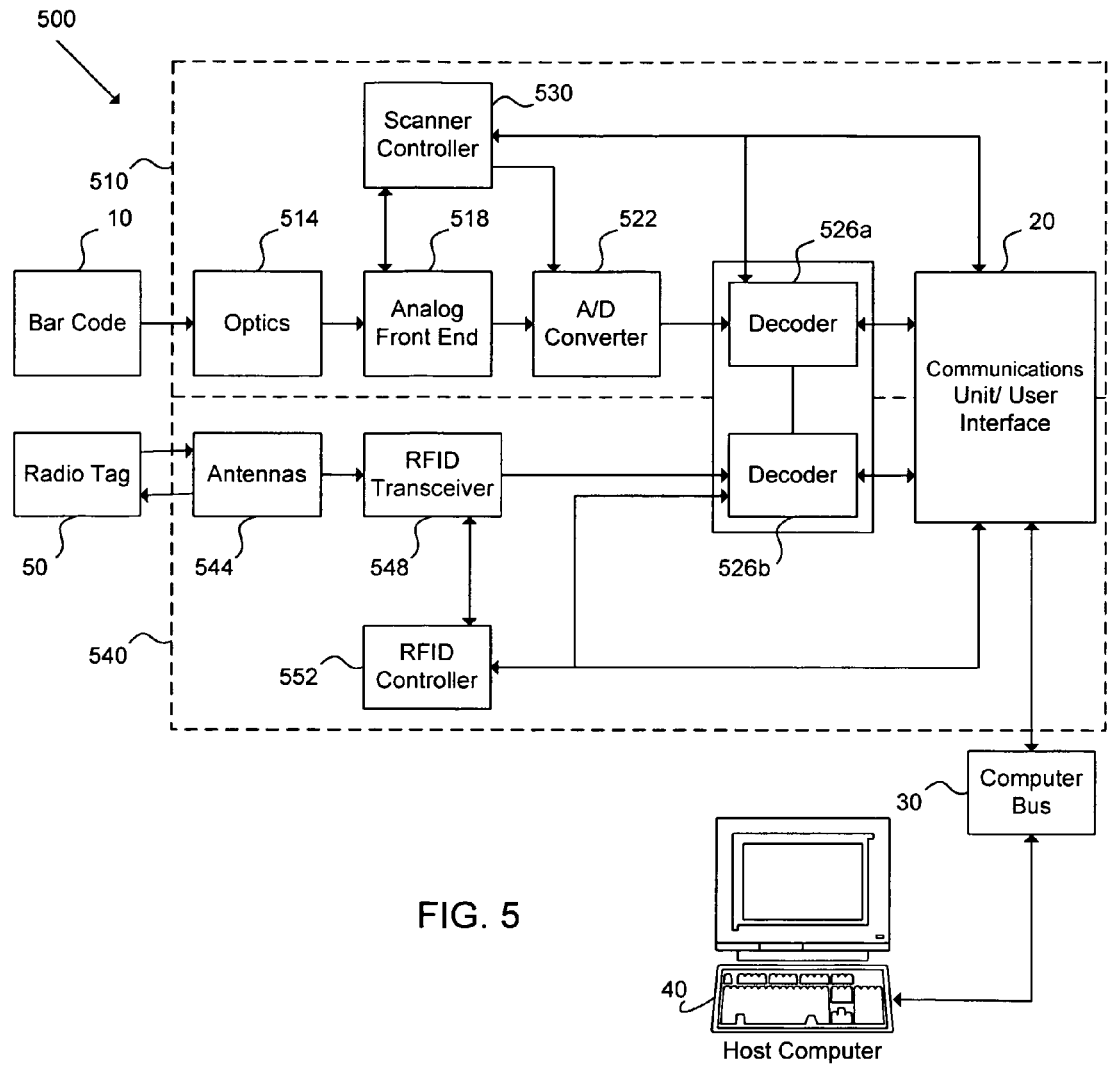
FIG. 5 is a block diagram of an embodiment of a multiple technology data reader using linearly polarized, switched antennas and an electromagnetic tag reader as disclosed in FIGS. 1 through 4.

FIG. 5 displays a block diagram of an embodiment of a multiple technology (or "multi-technology") data reader 500 using linearly polarized, switched antennas and an electromagnetic tag reader as disclosed herein. Tag readers 100, 120, 140, 200, and 300 may be incorporated into a larger multi-technology data reader 500, to include also an optical code reader 510 (e.g. bar code scanner), for instance. For example, U.S. Pat. No. 6,415,978 issued to McAllister ("the '978 patent"), which is incorporated by reference herein in its entirety, teaches a multi-technology reader employing an optical code reader 510 along with an RFID tag reader 540.

The optical code reader 510 of the multi-technology data reader 500 may include optics 514, which may transmit an optical signal, such as from one or more laser diodes, and receive a detected signal reflected from an optical code, such as a bar code 10. The optics typically comprise a photosensitive sensor or detector. The detected signal may include light reflected from the bars and spaces of the bar code 10. An optical collector may be included in the optics 514 for directing light onto the photosensitive detector to enable reception of a return optical signal from the bar code 10. The optics device 514 may send the detected optical signal to an analog front end 518, which may include circuitry to interface with the photosensitive detector. The analog signal may be converted to a digital signal by conversion in an analog-to-digital (A/D) converter 522. The converted signal may then be decoded by an optical code decoder 526a and then sent, via a communications unit 20 and computer bus 30, to a host computer 40. In the alternative, the communications unit and user interface 20 and host computer 40 may be integrated into a single computing and storage device within the multi-technology data reader 500, with an outside connection to another computer 40 only as an option, such as for consolidation of inventory tracking at a common server. The decoder 526a may convert the digitized signal into an identification code, or other identifying indicator, recognized by the computer 40 to be affiliated with a product.

The computer bus 30 may include a universal serial bus (USB), or other data bus, which may not only provide a bi-directional data link, but also means for delivering power to the reader 500 from the computer 40. In the alternative, the computer bus 30 may be a serial bus, or a wireless link to a wireless router, switch, or computer. In addition, an optics scanner controller 530 may communicate electronically with the analog front end 518, the A/D converter 522, and/or the decoder 526a to coordinate and adjust the processing and/or digitizing of an optically read signal, to ensure it is read and decoded properly. The scanner controller 530 may be a microcontroller, for example, or an integrated chip.

The RFID tag reader 540 may be included in the same, or in electrical communication with the same, optical code reader 510 to produce a multi-technology data reader 500. At least a set of non-parallel antennas 544, configured as taught in FIGS. 1A, 1B, 1C, and 1D, may be employed to interrogate an electromagnetic (e.g., RFID) tag 50. An RFID transceiver 548 may transmit an electromagnetic signal to resonant with the tag 50, and receive a modulated response from the tag 50. The received interrogated signal may be decoded by decoder 526b to extract from within the signal the identification of the tag 50. In addition, an RFID controller 552 may communicate electronically with the transceiver 548 to insure that each antenna 544 is alternately switched so as to provide the maximum possible power with which to interrogate. Once decoded, the identification of the tag 50 may be sent via a communications unit 20 and the computer bus 30 to the host computer 40. The decoder 526a may also convert the decoded tag identification into a format readable by the computer 40, or by an integrated computing and storage device 20 and 40 within the multi-technology data reader 500.

In integrating the optical code reader 510 and the RFID tag reader 540, the multi-technology data reader 500 may integrate a number of functions, to include different aspects of control circuitry and power, as well as at least one interface module, which may be integrated with the communications unit 20 for user control and interaction. For instance, the scanner controller 530 and the RFID controller 552 may be integrated on one fabricated chip, and may be included in a single microcontroller. Furthermore, the signal decoders 526a and 526b may further be integrated onto such a chip, both for quicker signal switching and processing, but also for economy of manufacture. The communication unit 20, however, may provide means by which the optical code reader 510 and the RFID tag reader 540 may communicate where such integration is not found, but must be designed into the data reader 500. This intercommunication may be further provided to the computer 40 through the communication unit 20 and the computer bus 30.

Furthermore, a user interface 20 may provide a user the ability to choose between reading with the optical code reader 510, the RFID tag reader 540, or with both simultaneously. The multi-technology reader 500 may also sense the device being read and automatically choose the correct reader 510 and/or 540. The interface 20 may also enable a user to configure the data reader 500, either directly through an input pad, or electronically through a host computer 40 via the computer bus 30. Finally, because the multi-technology data reader 500 may receive, simultaneously, identification readings from both the bar code 10 and the RFID tag 50, the computer 40 may reconcile inconsistent readings and determine if more than one product may be present, or an inventory mistake may be corrected. The multi-technology data reader 500 may include additional detecting, interface, filtering, and processing modules such as those discussed in the '978 patent.

The method 400 and other methods for interrogating a tag illustrated and described herein may exist in a variety of forms, both active and inactive. For example, they may exist as one or more software or firmware programs comprised of program instructions in source code, object code, executable code or other formats. Any of the above may be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program may be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense.

The invention claimed is:

1. A tag reader comprising:
   a plurality of linearly polarized antennas, including at least (a) first antenna and (b) a second antenna arranged non-parallel to, and structurally integrated with, the first antenna;
   a control circuit in electrical communication with the plurality of antennas, the control circuit operable to switch the plurality of antennas on and off causing the first and second antennas to alternately transmit electromagnetic signals with different linear polarizations; and
   circuitry coupled to the plurality of antennas to receive an electromagnetic signal from a tag in response to a transmission from at least one of the plurality of antennas, thereby establishing radio frequency communication with the tag is substantially insensitive to orientation of the tag relative to the antennas.

2. A tag reader according to claim 1, wherein the control circuit comprises a microprocessor.

3. A tag reader according to claim 1, wherein the first and second antennas are arranged in an integrated patch antenna configuration.

4. A tag reader according to claim 1, wherein the control circuit switches the plurality of antennas on and off sequentially, thereby alternately coupling full power into each of the plurality of antennas.

5. A tag reader according to claim 1, wherein at least one of the plurality of antennas is an antenna array.

6. A tag reader according to claim 1, further comprising an optical code reader comprising:
   a photosensitive detector;
   an optical collector for directing light reflected from a bar code onto the photosensitive detector;
   circuitry coupled to the photosensitive detector to process the detected light; and
   a decoder to decode the processed detected light.

7. An RFID interrogator comprising:
   a radio frequency transceiver;
   a first linearly polarized antenna in electrical communication with the transceiver;
   a second linearly polarized antenna in electrical communication with the transceiver, the second antenna being arranged in an integrated structure with the first antenna having a polarization in a direction substantially perpendicular to polarization of the first antenna;
   a control circuit in electrical communication with the transceiver and with the first and second antennas, the control circuit operable to switch between interrogating at full power with the first antenna from a first direction and interrogating at full power with the second antenna from a second direction orthogonal to the first direction; and
   an RFID decoder coupled to an output of the transceiver to decode an interrogated electromagnetic signal from a tag.

8. An interrogator according to claim 7, wherein the control circuit is user-controlled.

9. An interrogator according to claim 7, wherein the control circuit comprises a microprocessor.

10. An interrogator according to claim 7, wherein the first antenna is horizontally polarized, and the second antenna is vertically polarized.

11. An interrogator according to claim 7, wherein the first and second polarized antennas are integrated into a patch antenna configuration.

12. An interrogator according to claim 7, wherein the first antenna comprises two polarized antennas, including one to interrogate for the electromagnetic signal and one to receive the interrogated electromagnetic signal.

13. An interrogator according to claim 7, wherein the second antenna comprises two polarized antennas, including one to interrogate for the electromagnetic signal and one to receive the interrogated electromagnetic signal.

14. An interrogator according to claim 7, wherein each of the first antenna and the second antenna each comprises an antenna array.

15. An interrogator according to claim 7, further comprising an optical code reader comprising:
   a photosensitive detector;
   an optical collector for directing light onto the photosensitive detector to receive a return optical signal from a bar code;
   circuitry coupled to the photosensitive detector to process the return optical signal and to digitize the processed optical signal; and
   a decoder to convert the digitized signal into an identification code.

16. An interrogator according to claim 15, further comprising:
   a communications unit in electrical communication with the optical code reader and the electromagnetic tag reader; and
   a computer bus coupled to the communications unit to send the decoded electromagnetic signal from the tag and the decoded identification code from the bar code to a computer.

17. An interrogator according to claim 16, wherein the communications unit and the computer are integrated within the interrogator.

18. A data reader comprising:
   an RFID tag reader comprising:
      a plurality of linearly polarized antennas, including at least a first antenna and a second antenna arranged non-parallel to, and structurally integrated with, the first antenna;
      a control circuit in electrical communication with the plurality of antennas, the control circuit operable to switch the plurality of antennas on and off causing the first and second antennas to alternately transmit electromagnetic signals with different linear polarizations;
      circuitry coupled to the plurality of antennas to receive an electromagnetic signal from a tag, in response to a transmission from at least one of the plurality of antennas, thereby establishing radio frequency communication with the tag that is substantially insensitive to the orientation of the tag; and
      an RFID decoder coupled to an output of the circuitry to extract the tag's identification from the received electromagnetic signal; and
   an optical code reader comprising:
      an optical light source to reflect light off a bar code;
      a photosensitive detector to receive a return optical signal from the bar code;
      circuitry coupled to the photosensitive detector to process the return optical signal and to digitize the processed signal; and
      an optical decoder to decode the digitized signal to extract the bar code's identification therefrom.

19. A data reader according to claim 18, further comprising a computer bus in electrical communication with the optical and the RFID decoders to send the extracted tag and bar code identifications to a computer.

20. A data reader according to claim 19, further comprising a communications unit in electrical communication with the RFID tag reader and with the optical code reader, the communications unit coupled to the computer bus.

21. A data reader according to claim 20, further comprising a user interface in electrical communication with the communications unit to enable a user to configure and control the multi-technology reader.

22. A data reader according to claim 20, wherein the communications unit and the computer are integrated within the data reader.

23. A method of orientation-insensitive tag interrogation, comprising:
   alternately transmitting electromagnetic signals from a plurality of at least first and second non-parallel, linearly polarized antennas arranged in an integrated structure, wherein the first and second antennas transmit at different times, at a switching rate comparable to a wired data transmission rate;
   receiving from the tag a return electromagnetic signal, having a signal strength, and including the identification of a tag in response to a transmission from at least one of the plurality of antennas, the signal strength of the return electromagnetic signal being substantially insensitive to the orientation of the tag; and processing the return electromagnetic signal to extract information from the tag, including the tag's identification.

24. A method according to claim 23, the method further comprising switching sequentially in the alternate transmission of the plurality of antennas.

25. A method according to claim 24, wherein only one of the plurality of antennas transmits at any given time.

26. A computer readable medium having stored thereon computer executable instructions for performing or causing to be performed the method of claim 23.

27. a method according to claim 23 wherein the first and second antennas are arranged in an integrated patch antenna configuration.

28. A method of orientation-insensitive tag interrogation, the method comprising:
   transmitting a first electromagnetic signal with a first linearly polarized antenna;
   transmitting a second electromagnetic signal with a second linearly polarized antenna before or after the transmission of the first electromagnetic signal, the second antenna having a polarization in a direction not appreciably parallel to polarization of the first antenna;
   receiving from the tag a return electromagnetic signal having a signal strength and including the identification of the tag in response to a transmission from at least one of the first and second antennas, the signal strength of the return electromagnetic signal being substantially insensitive to the orientation of the tag; and
   processing the return electromagnetic signal to extract information from the tag, including the tag's identification.

29. A method according to claim 28, wherein the second antenna is polarized in a direction substantially perpendicular to the first antenna.

30. A method according to claim 28, the method further comprising switching sequentially between transmitting with the first antenna and transmitting with the second antenna.

31. A method according to claim 28, wherein the first antenna is horizontally polarized, and the second antenna is vertically polarized.

32. A method according to claim 28, wherein the first antenna comprises two polarized antennas, including one to transmit the first electromagnetic signal and one to receive the return electromagnetic signal.

33. A method according to claim 28, wherein the second antenna comprises two polarized antennas, including one to transmit the second electromagnetic signal and one to receive the return electromagnetic signal.

34. A computer readable medium having stored thereon computer executable instructions for performing or causing to be performed the method of 28.

35. A method according to claim 28 wherein the first antenna is horizontally polarized, and the second antenna is vertically polarized, the method further comprising switching between interrogating at full power with the first antenna from a first direction and interrogating at full power with the second antenna from a second direction orthogonal to the first direction.

36. A method according to claim 28 wherein the first and second antennas are arranged in an integrated patch antenna configuration.

* * * * *

UNITED STATES PATENT AND TRADEMARK OFFICE
CERTIFICATE OF CORRECTION

PATENT NO. : 7,515,051 B2
APPLICATION NO. : 11/356887
DATED : April 7, 2009
INVENTOR(S) : Wagner et al.

It is certified that error appears in the above-identified patent and that said Letters Patent is hereby corrected as shown below:

<u>Column 10</u>
Line 49, after "(a)" add --a--.
Line 61, after "tag" add --that--.

<u>Column 11</u>
Line 21, after "antenna" add --and--.

<u>Column 12</u>
Line 64, before "tag" change "a" to --the--.

Signed and Sealed this

Twenty-third Day of June, 2009

JOHN DOLL
*Acting Director of the United States Patent and Trademark Office*